March 4, 1969   J. A. JOSLYN   3,431,479
PHASE CONTROLLED POWER AMPLIFIER LOCKOUT CIRCUIT
Filed Oct. 7, 1965
FIG. 1
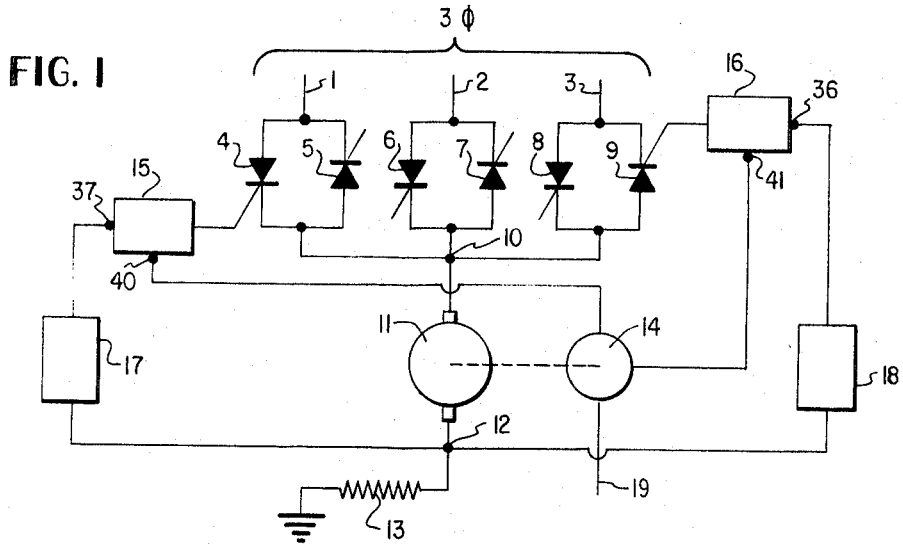
FIG. 3
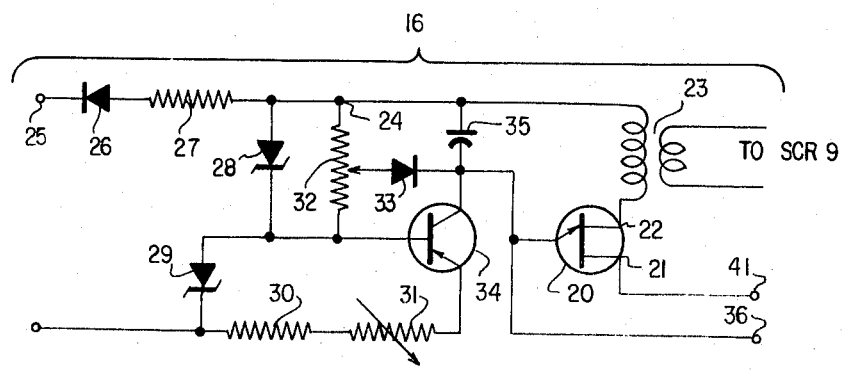
FIG. 4
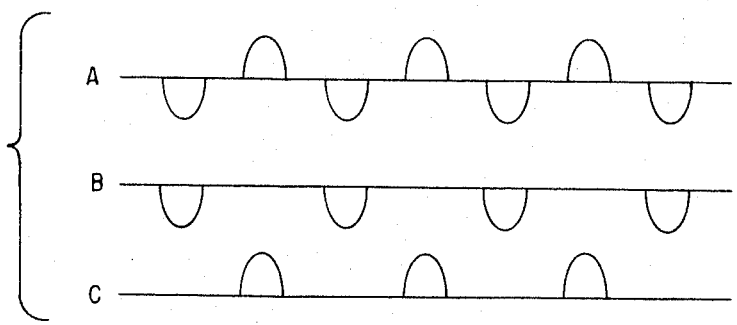
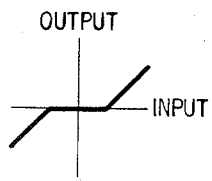
FIG. 5
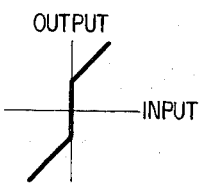
FIG. 6
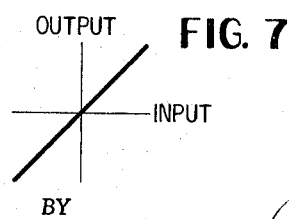
FIG. 7
*INVENTOR*
JOHN A. JOSLYN
BY *J. F. McDevitt*
*ATTORNEY*

INVENTOR
JOHN A. JOSLYN

BY J.F. McDevitt

ATTORNEY

United States Patent Office 3,431,479
Patented Mar. 4, 1969

3,431,479
PHASE CONTROLLED POWER AMPLIFIER LOCKOUT CIRCUIT
John A. Joslyn, Dalton, Mass., assignor to General Electric Company, a corporation of New York
Filed Oct. 7, 1965, Ser. No. 493,634
U.S. Cl. 318—257       3 Claims
Int. Cl. G05b 5/01; H02k 27/20; H02p 7/06

ABSTRACT OF THE DISCLOSURE

A lockout circuit is provided for a bidirectional rectification system supplying bidirectional power to a D-C motor which senses the direction of current flowing in the D-C motor and then inhibits or locks out the SCR's poled in a direction opposite the direction sensed. A resistor senses current in a desired direction and supplies a signal to a modified Schmitt trigger circuit which puts a low potential on a capacitor in the firing circuit for SCR's poled in an undesired direction so that no triggering pulses are supplied thereto. The lockout circuit also provides regenerative feedback from the rectification system output to input within the motor deadband region so as to reduce or eliminate the deadband.

---

Figure 2:
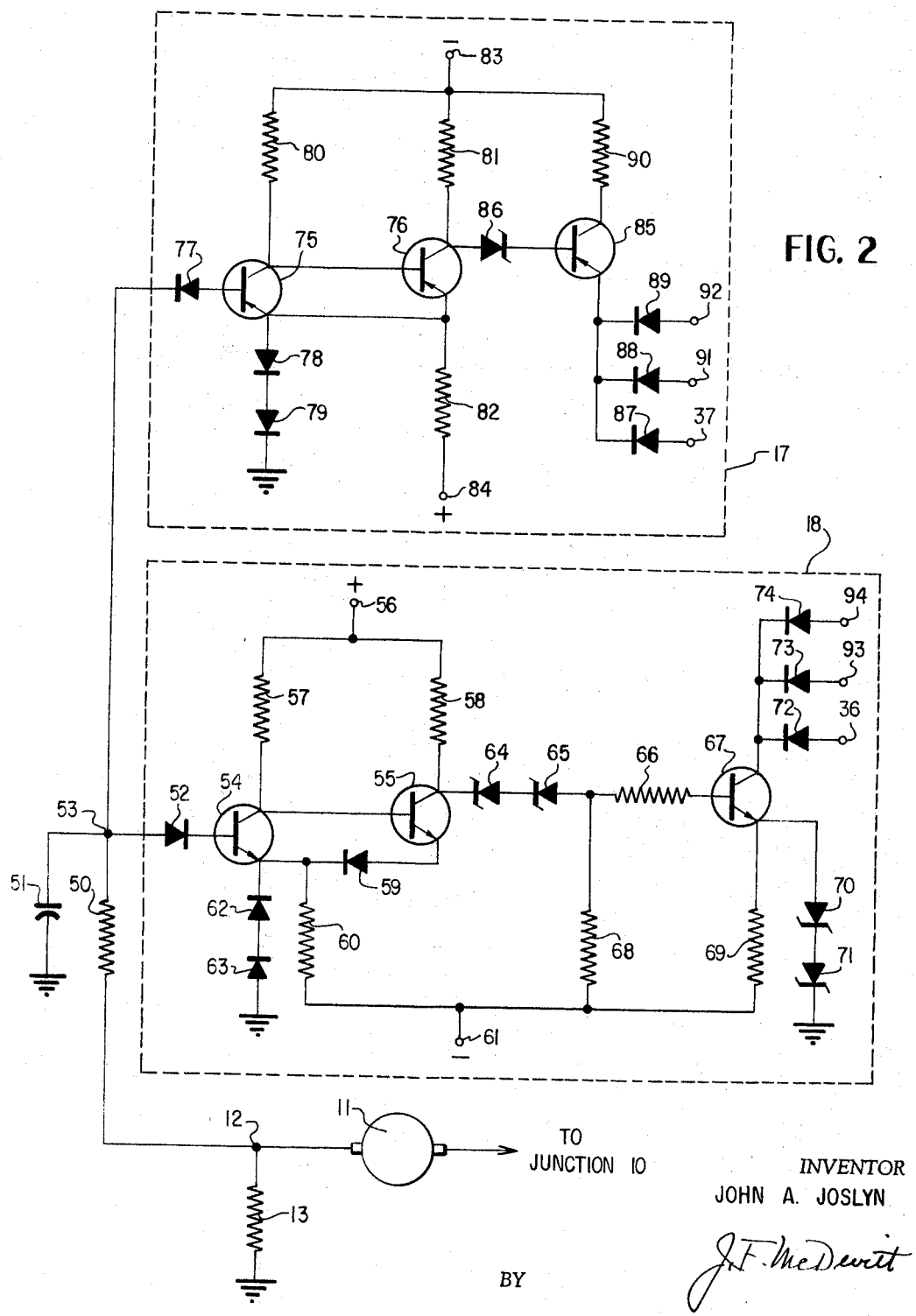

This invention relates to phase controlled power amplifiers and more particularly to phase controlled power amplifiers for reversible DC motors.

A common application of reversible DC motors is as the prime mover for a servo positioning system such as a gun mount. In such a system the DC motor is driven with electrical voltage of a polarity and magnitude which is dependent upon an error signal developed by comparison of a position input signal and a position feedback signal in a servo amplifier. To accomplish this a phase controlled power amplifier is often used to supply the proper voltage to the motor. The power amplifier may comprise three sets of two SCR's connected reversely in parallel, each set respectively connecting one phase of a three phase AC power line to the motor. Depending on whether the motor is to be driven in the forward or reverse direction, the three respective SCR's poled in the positive or negative direction will be rendered conductive in order to put DC voltage across the motor of the desired polarity. Depending on the desired magnitude of DC voltage, the error signal from the servo amplifier is caused to gate the desired SCR's into conduction at a proper phase angle of the AC half cycle. By regulating the phase angle at which the SCR's trigger into conduction, the average DC voltage delivered by the SCR's can be varied.

Although solid state power amplifiers such as described above have been found to be particularly useful in such systems, specific problems have arisen which, in order to achieve a more perfect power supply system, must be alleviated. One of these problems is the tendency of SCR's poled in a direction opposite to the desired direction of current flow at any particular instant of time to spuriously turn on thereby short circuiting the current between the phases and away from the DC motor. This results in excessive currents flowing through the system which may cause extensive damage. The problem is usually greatest when the input error signal reverses rapidly. This problem has been termed "crossfire between phases" and has been the subject of much effort directed toward its solution without substantial success. Another problem arises from the fact that all reversible DC motors exhibit a region around zero velocity or null in which energy required to overcome the internal inertia and friction of the motor is higher than would normally be required if the motor were initially moving. Within this region, which is called "dead band," variations in motor terminal voltage cause no motion of the motor shaft. The effect of this is to create a low gain characteristic of the power amplifier and motor system at, or around, zero velocity which is highly undesirable.

It is therefore an object of this invention to provide a phase controlled power amplifier for a DC motor which eliminates the problem of crossfire.

It is another object of this invention to provide a DC power amplifier for a reversible DC motor which exhibits a high gain characteristic at, and around, zero velocity of the DC motor.

It is a further object of this invention to provide a power amplifier for a DC motor which combines the desired features of crossfire elimination and high gain characteristic at zero velocity in a single device.

These and further objects of this invention are achieved in a lockout circuit which senses the direction of current flowing in the DC motor and then inhibits or "locks out" the SCR's which are poled in a direction opposite that direction sensed. The lockout circuit provides regenerative feedback from the motor to the power amplifier at zero motor velocity thereby causing the applied motor terminal voltage to move rapidly between the limits of the dead band region, thus making the gain characteristic of the power amplifier high and reducing or eliminating system dead band.

The subject matter regarded as my invention is particularly pointed out and distinctly claimed in the appended claims. The invention, however, both as to its mode of operation, together with further objects and advantages thereof, may best be understood with reference to the following description taken in connection with the accompanying drawings in which:

FIG. 1 shows a block diagram of a reversible DC motor which is supplied power from a phase controlled power amplifier and which employs the lockout circuitry according to the present invention, FIG. 2 shows detailed circuit diagrams of the voltage level detectors used in the lockout circuitry of the present invention, FIG. 3 shows a detailed circuit diagram of a firing circuit for one of the SCR's in the power amplifier of FIG. 1, FIG. 4 shows three current wave shapes representative of the current in the motor at critical times in the operation of the present invention, and FIGS. 5, 6, and 7 all show various gain characteristics at or around zero velocity of the motor and which are illustrative of the present invention.

Referring now to FIG. 1, three phase power, comprising phases 1, 2, and 3, is shown supplied to a solid state power amplifier comprising six silicon controlled rectifiers over conductors 1, 2, and 3 respectively. The particular phase at each respective conductor supplies power to a pair of SCR's connected reversely in parallel. The six SCR's in the power amplifier are represented by the numerals 4 through 9 respectively and their polarities are such that SCR's 4, 6, and 8 supply positive current and SCR's 5, 7, and 9 supply negative current. Each of the SCR's comprises an anode, a cathode, and a gate electrode and is characterized in that it exhibits a high and a low impedance state. Typically an SCR is triggered into its low impedance state when a positive anode voltage with respect to the cathode voltage is present and a triggering pulse is supplied to the gate electrode. After the SCR has been triggered into conduction the control over it by the gate electrode ceases and it will continue to conduct as long as there is a positive anode voltage present.

The output of each respective pair of SCR's in the power amplifier is connected at a common junction point 10, which point is connected to the armature circuit of a reversible DC motor 11. The side of the armature circuit of the motor 11 opposite the junction point 10 is connected to another junction point 12 and then through a series connected resistor 13 to ground. The motor 11 operates to drive any suitable load which is not shown for the sake of clarity. Control over the speed and direction of the motor, and therefore the load, is obtained by varying the magnitude and the direction of the voltage supplied by the SCR's in the power amplifier to the motor. The motor is caused to drive the load in the positive direction when the SCR's 4, 6, and 8 conduct and in the negative direction when the SCR's 5, 7, and 9 conduct. A servo error amplifier 14 is shown mechanically coupled to the shaft of the motor 11 and electrically connected to two triggering circuits 15 and 16 for the SCR's 4 and 9 respectively. Depending upon the actual mechanical position of the shaft of motor 11 and therefore the position of the load, the servo amplifier 14 develops an error signal indicative of the difference between the actual position and the desired position of the load on terminal 19. This error signal is delivered to the triggering circuits 15 and 16 at terminals 40 and 41 respectively to control time of conduction of the SCR's 4 and 9. An error signal of proper polarity and magnitude presented by the servo amplifier 14 to the triggering circuit 15 causes the SCR 4 to conduct at a desired phase angle in the positive half cycle of the AC voltage delivered over conductor 1. Since the average value of voltage delivered through the SCR 4 to the motor 11 is a function of the phase angle at which the SCR is rendered conductive, the triggering circuit error signal developed by the servo amplifier 14 effects a control over the magnitude of the voltage delivered to the motor 11. In a similar manner the servo amplifier 14 can be made to control the magnitude of negative voltages delivered to the motor 11 by sending an error signal to the trigger circuit 16 to trigger the SCR 9 at a desired phase angle of the negative half cycle of the phase present at the condutcor 3. It should be understood that similar connections from the servo error amplifier 14 to triggering circuits for the SCR's 5, 6, 7, and 8 are also necessary; but, since they are identical to the connections shown for the SCR's 4 and 9, they are omitted from FIG. 1 for the sake of clarity.

It has been observed that polyphase reversible rectifier systems such as shown in FIG. 1 are troubled due to crossfire. This means one, that the SCR's connected in a direction opposite the desired direction of current flow through the motor 11 at any particular instant in time may be caused to spuriously turn on and be rendered conductive. Crossfire occurs also when the servo error amplifier 14 is delivering a rapidly reversing error signal to the triggering circuits 15 and 16 such that SCR 9 is triggered before SCR 4 has ceased to conduct current thereby short circuiting the power delivered by the SCR 4 from phase 1 away from the motor 11 and through the SCR 9 to phase 3. This is the crossfire source which is one of the problems to be overcome by the present invention.

In order to eliminate crossfire the series resistor 13 in the armature circuit of the motor 11 is utilized to develop a voltage thereacross which is indicative of the direction of a current flowing through the motor 11. This DC voltage level is sensed by voltage level detectors 17 and 18 which deliver an inhibiting signal to the triggering circuits for the SCR's which are not supposed to be conducting. To illustrate this, suppose that the motor 11 is desired to run in a positive direction thereby requiring positive currents to be supplied from the positive connected SCR's 4, 6, and 8. An error signal from the servo amplifier 14 will control the trigger circuit 15 to trigger the SCR 4 into conduction at a particular phase angle. Similarly, the error amplifier 14 will control the SCR's 6 and 8 to deliver positive current at the same phase angles. The resulting positive current flowing through the motor 11 and the resistor 13 will develop a voltage at the junction point 12 which is positive with respect to ground and is indicative of positive current flowing through the motor 11. The voltage level detector 18, which is designed to detect positive voltages at the junction point 12, delivers an inhibiting signal to the triggering circuit 16 for the negative poled SCR 9. The detector 18 also delivers inhibiting signals to the triggering circuits for the SCR's 5 and 7, the connections of which are not shown for the sake of clarity. The inhibiting signals operate on the trigger circuits so that no triggering pulses are allowed to be created which would turn on the SCR's 5, 7, and 9 until SCR's 4, 6, and 8 cease to conduct. In this manner the problem of crossfire current flowing from the positive rectifiers to the negative rectifiers is eliminated.

Should a negative current be flowing in the motor 11, a negative voltage with respect to ground will be developed across the resistor 13 at the junction point 12 which will be detected by the voltage level detector 17. The detector 17 sends an inhibiting signal to the firing circuit 15 as well as the firing circuits for the SCR's 6 and 8 the connections for which are not shown. In this manner crossfire from the negative SCR's to the positive SCR's is eliminated.

The voltage level detectors 17 and 18 are shown in greater detail in FIG. 2. In FIG. 2 the DC motor 11 is shown connected through the resistor 13 to ground via a junction terminal 12. The detectors 17 and 18 are connected to the junction point 12 via an RC noise filter comprising a resistor 50 and a capacitor 51. In a preferred embodiment both the voltage level detectors 17 and 18 are modifications of the known Schmitt trigger which is a bistable regenerative circuit that presents an output signal the state of which depends on the polarity and the amplitude of the input signal. When the detector 18 detects positive voltages above a certain threshold voltage at the terminal 12, its output signal inhibits the firing circuit 16 and the two other firing circuits not shown for the negative connected SCR's. In a like manner the detector 17 detects negative voltages below a certain threshold voltage at the junction point 12 and sends an inhibiting signal to the firing circuit 15 and the other two firing circuits for the positive connected SCR's. The detectors 17 and 18 operate when they detect negative and positive voltages below and above a certain threshold voltage respectively in order to provide a certain leeway around zero voltage. The reason for this is because temperature variations in the system could cause the operating points to shift and possibly cross zero if it were not for the tolerance provided by the threshold voltages.

Turning now to the specific circuitry of the voltage level detectors in one embodiment, a diode 52 is connected between the junction 53 of the capacitor 51 and the resistor 50 and the base electrode of an NPN transistor 54. The collector electrode of the transistor 54 is directly coupled to the base electrode of a second NPN transistor 55. Positive supply voltage is supplied to the transistors 54 and 55 at a terminal 56 via a pair of collector resistors 57 and 58 respectively. The emitters of the transistors 54 and 55 are tied together through a diode 59 poled in a direction for positive current from the emitter of the transistor 55 to the emitter of the transistor 54. An emitter resistor 60 is connected from the junction of the emitter electrode of the transistor 54 and the diode 59 to a negative voltage power terminal 61. A pair of series connected diodes 62 and 63 are connected between the emitter of the transistor 54 and ground and are poled in a direction opposite to the forward direction of the diode 52 and the base-emitter junction of the transistor 54. In one embodiment the diode 52; the transistor 54, and the diode 63 are chosen to be silicon semiconductor devices and the diode 62 is chosen to be a germanium semiconductor device. Since the forward voltage drops across silicon and germanium semiconductor devices are different, and since the devices 52 and 54 are connected in opposition to the devices 62 and 63, a positive threshold voltage to be overcome before the transistor 54 can be rendered conductive is set which is approximately equal to the difference between the forward voltage drops of a silicon and a germanium semiconductor device. By this means the threshold voltage is set and in one embodiment it is approximately three-tenths of a volt above zero.

In the operation of the Schmitt trigger circuit as described, the transistor 54 is normally biased off and the transistor 55 is normally biased into conduction. When a positive voltage is present at the terminal 12, indicating a positive current flowing through the motor 11, and when this positive voltage is sufficient to present a positive voltage at the junction terminal 53 in excess of the threshold voltage, the transistor 54 is rendered conductive thereby substantially lowering the base voltage at the transistor 55 sufficient to bias it into nonconduction. This lowers the emitter voltage of the transistor 55 and since it is coupled back to the emitter of the transistor 54, the latter is further forced into conduction. Thus the process is regenerative giving rise to a snap-action response.

When the voltage at the junction 53 decreases below the threshold voltage, the reverse operation occurs and the transistor 54 is rendered nonconductive thereby forcing the transistor 55 back into conduction.

The collector electrode of the transistor 55 is connected via a pair of series connected Zener diodes 64 and 65 and a biasing resistor 66 to the base electrode of a third NPN transistor 67. A resistor 68 is connected between the junction of the diode 65 and the resistor 66 to the negative power terminal 61. The base biasing circuit for the transistor 67 comprises the resistor 58, the Zener diodes 64 and 65, and the resistors 66 and 68. When there is no positive voltage present at junction point 53, this biasing circuit biases the transistor 67 off. When the transistor 55 is rendered nonconductive, thereby indicating the presence of positive current flowing through the motor 11, the voltage at the base of the transistor 67 substantially increases thereby rendering the transistor 67 conductive. The emitter electrode of the transistor 67 is connected through an emitter biasing resistor 69 to the negative power terminal 61 and also through a pair of forward connected Zener diodes 70 and 71 to ground. The values of the emitter biasing circuit comprising the resistor 69 and the Zener diodes 70 and 71 are chosen so that a substantially high and negative constant voltage is available at the emitter electrode. Thus when the transistor 67 is rendered conductive it immediately saturates. The collector electrode of the transistor 67 is connected to three output circuits, each including a diode 72, 73, and 74 respectively connected in the direction for easy current flow into the collector electrode of the transistor 67. The output circuit including the diode 72 can be connected to the terminal 36 in the unijunction transistor triggering circuit 16 shown for the SCR 9 and the other two diodes 73 and 74 can be connected via terminals 93 and 94 to the triggering circuits not shown for the other two negative connected SCR's 5 and 7. The output terminal 36 is shown in FIG. 3 to be connected to a trigger energy storage capacitor 35. Although the triggering circuit illustrated in FIG. 3 will be described in detail hereinafter, it will be understood that when the transistor 67 becomes saturated a very low impedance negative voltage signal is effectively connected to the capacitor 35 thereby discharging it and holding it at a very negative voltage level. This effectively inhibits the firing circuit from triggering the SCR 9 into conduction as will be more readily understood from the description to follow.

The voltage level detector 17 is very similar to the voltage level detector 18; however, since it is designed to detect negative voltages below a certain threshold voltage the polarities of the various diodes and the types of transistors used must be reversed from their complementary elements in detector 18. Thus the two transistors 75 and 76 in the Schmitt trigger portion of the voltage level detector 17 are PNP devices and the base diode 77 and the two emitter diodes 78 and 79 are connected in directions opposite to that of their counterparts in the detector 18. The resistors 80, 81, and 82 are substantially the same as their counterparts in the detector 18; however, they are connected to power terminals 83 and 84 which are of the opposite polarity than their counterpart terminals 56 and 61. A PNP transistor 85 is used as the output signal transistor in the detector 17 and a proper base bias is obtained through the utilization of a single Zener diode 86. A slight modification of the output circuit portion of the detector 17 from that of the detector 18 is necessary since the transistor 85 is of the opposite polarity type. Thus, instead of operating the transistor 85 as a saturating inverting transistor as is the case in the detector 18, the transistor 85 is connected as an emitter follower with three output diodes 87, 88, and 89 connecting three output terminals 37, 91, and 92 respectively to the emitter electrode. The collector electrode of the transistor 85 is connected through a collector dissipating resistor 90 to the negative power terminal 83. When the detector 17 detects a negative voltage at the junction point 53 below the threshold voltage, the transistor 85 conducts and presents a low impedance negative voltage signal source to the output terminals 37, 91, and 92. As indicated in FIG. 1, the output terminal 37 is shown connected to the unijunction transistor triggering circuit 15 for the positive connected SCR 4. This output signal at the terminal 37 acts to inhibit the firing circuit 15 from rendering the SCR 4 conductive in the same manner as the output signal at the terminal 36 operates on the firing circuit 16. The terminals 91 and 92 are respectively connected to the firing circuits, not shown, for the SCR's 6 and 8.

A triggering circuit 16 which will react to such an output signal from the voltage level detector 18 is illustrated in detail in FIG. 3. In FIG. 3 the trigger circuit 16 is shown to comprise a unijunction transistor 20 shown with its base one electrode 21 adapted to be connected to terminal 41 to receive the error signal developed by the servo amplifier 14 and its base two electrode 22 connected to the primary winding of a pulse output transformer 23, the secondary of which is adapted to be connected to the gate-cathode circuit of the SCR 9. A half wave rectified voltage is adapted to be presented to a junction point 24 from an AC source connetced to a terminal 25. A diode 26 and a resistor 27 develop the proper polarity and magnitude voltage at the terminal 24. The combination of a first Zener diode 28, a second Zener diode 29, resistor 30, an adjustable resistor 31, a potentiometer 32, a diode 33, and a transistor 34 all act to develop a constant current flowing through the emitter-collector path of the transistor 34.

The constant current flowing through the transistor 34 is caused to charge a capacitor 35 connected between the collector electrode and the junction point 24. Since the charging current is constant, the voltage wave form across the capacitor 35 is substantially linear. The linear varying voltage across the capacitor 35 is presented to the emitter electrode of the unijunction transistor 20. Depending on the magnitude of the error signal presented to the base one electrode 21 of the unijunction transistor 20, the unijunction transistor will break down at some phase angle of the AC voltage at the terminal 25 and will discharge the energy stored in the capacitor 35 through the pulse transformer thereby causing the SCR 9 to conduct. The specific circuitry of the unijunction transistor firing circuit illustrated in FIG. 3 is not important for the purposes of adequately describing the present invention and, therefore, a detailed description is deemed unnecessary. For a more complete description of the circuit illustrated in FIG. 3, reference is made to applicant's copending applicaiton Ser. No. 479,550, filed Aug. 13, 1965. Since any type of SCR triggering circuit can be used in carrying out applicant's invention, it should be clear that applicant does not intend to be limited to the embodiment shown in FIG. 3.

The emitter electrode of the unijunction transistor 20 is adapted to be connected to the output circuit of the voltage level detector 18 via a terminal connection 36. Upon detecting a positive voltage at the terminal 12, the detector 18 presents a low impedance path to the terminal 36 which causes the energy stored in the capacitor 35 to be discharged away from the pulse transformer 23 thereby inhibiting conduction of the SCR 9. The negative voltage level detector 17 is shown connected between the junction point 12 and the terminal 37 of the firing circuit 15 of the SCR 4 and operates to discharge the energy capacitor in the firing circuit 15 upon sensing a negative polarity voltage at the junction point 12. It will be apparent that in a similar manner the triggering circuits for the SCR's 5–8 can be inhibited although for the sake of clarity the connections from the voltage level detectors 17 and 18 to the firing circuits for the SCR's 5–8 are not shown.

FIG. 5 illustrates the effects of the dead band region on the overall gain characteristic of the SCR power amplifier and motor system. For small variations around zero input it is seen that no change in output is experienced. In order to eliminate this effect, the input signal is conditioned by the action of the inhibiting circuits to move more rapidly between the two limits of the dead band region, so that the gain characteristic of the SCR's with the inhibiting circuits connected is as illustrated in FIG. 6. This conditioning effect on the input signal resulting from the action of the inhibiting circuits is achieved in the following manner: Without the inhibiting circuits connected, the firing circuits are adjusted so that each SCR conducts to give a resultant AC current to the motor, the magnitude of each half cycle being slightly below that needed to yield a breakaway torque in the motor. The wave shape of the motor current without the inhibiting circuits connected is shown in graph A of FIG. 4. Now, by connecting the inhibiting circuits, the wave shape of the current through the motor changes to that illustrated by either graph B or C of FIG. 4 depending upon whether the input signal is slightly positive or negative. This effect comes about because of the fact that for even very small changes in the input signal in one direction and therefore small advances in the firing angles for the SCR's poled in that direction, the slightly increased motor current in that direction will inhibit conduction of the rectifiers poled in the opposite direction. This causes the current flowing to the motor in the opposite direction to decrease which, in effect, creates an increase in the current flowing in the desired direction. The increase in desired current further advances the firing angle of the SCR's poled in the desired direction which, in turn, further decreases the current flowing in the undesired direction. Thus, the effect is regenerative and continues until only the desired set of SCR's is conducting and the opposite set is completely inhibited. The resulting wave form is illustrated in graphs B and C of FIG. 4. The magnitude of the pulses shown in graph A were chosen to be slightly below the breakaway torque of the motor so that the regenerative effect on the input signal or high gain region would not extend beyond the dead band region of the motor thus yielding an undesired oscillatory effect. The total system response of the SCR power amplifier and motor with the inhibiting circuits connected is therefore a linear characteristic with changes in the input signal causing proportional changes in output signal throughout the entire range of input signals. This response is illustrated in FIG. 7.

Although I have described my invention in a particular embodiment, the principles underlining the invention will suggest many modifications of this embodiment to those skilled in the art. Therefore, it is desired that the appended claims not be limited to the described embodiment but rather should cover all such modifications as fall within the spirit and scope of this invention.

What is claimed as new and desired to be secured by Letters Patent of the United States is:

1. A phase control silicon controlled rectifier power amplifier system for transmitting current from a multiphase AC source to a reversible DC motor comprising:
    (a) a first set of silicon controlled rectifiers connected between the AC source and the revesible DC motor for conducting current in a positive direction;
    (b) a second set of silicon controlled rectifiers connected between the AC source and the reversible DC motor for conducting current in a negative direction;
    (c) a first set of triggering circuits connected to said first set of silicon controlled rectifiers for controlling the conduction thereof and thus the magnitude of the positive current flowing therethrough;
    (d) a second set of triggering circuits connected to said second set of silicon controlled rectifiers for controlling the conduction thereof and thus the magnitude of the negative curent flowing therethrough;
    (e) means for sensing the direction of current flowing from said silicon controlled rectifiers through the reversible DC motor;
    (f) means connected to said sensing means for developing a signal indicative of the direction of current flowing through the motor, said signal developing means being connected to said first and said second sets of triggering circuits;
    (g) said first set of triggering circuits being responsive to signals indicative of current flow in the negative direction to inhibit triggering of said first set of silicon controlled rectifiers; and
    (h) said second set of triggering circuits being responsive to signals indicative of current flow in the positive direction to inhibit triggering of said second set of silicon controlled rectifiers.

2. A phase control rectification system as claimed in claim 1 wherein, the means for sensing the direction of current flow through the reversible DC motor comprises a resistor connected in series with the reversible DC motor, said means connected to said sensing means for developing a signal indicative of the direction of current flowing through the motor comprises first and second voltage level detectors, said first voltage level detector being responsive to negative voltages developed by said resistor and being connected to said first set of triggering circuits, and said second voltage level detector being responsive to positive voltages developed by said resistor and being connected to said second set of triggering circuits.

3. The method of reducing the system dead band of a phase control rectification system for a reversible DC motor including lockout circuits for preventing crossfire between phases of the rectification system including the steps of,
    (a) adjusting the rectification system at zero velocity of the motor and with the lockout circuits disconnected until the rectification system supplies alternating current pulses to the motor of a magnitude slightly less than the magnitude needed to cause the motor to turn, and
    (b) connecting the lockout circuits with the rectification system so adjusted to produce a regenerative feedback path between the output and the input of the rectification system within the dead band region.

References Cited
UNITED STATES PATENTS

| | | | |
|---|---|---|---|
| 3,128,396 | 4/1964 | Morgan | 307—88.5 |
| 3,164,767 | 1/1965 | Morgan | 321—35 |
| 3,302,089 | 1/1967 | Rosa et al. | 318—257 |

ORIS L. RADER, *Primary Examiner.*

K. L. CROSSON, *Assistant Examiner.*

U.S. Cl. X.R.

318—293, 327, 345